Figures 1, 2:
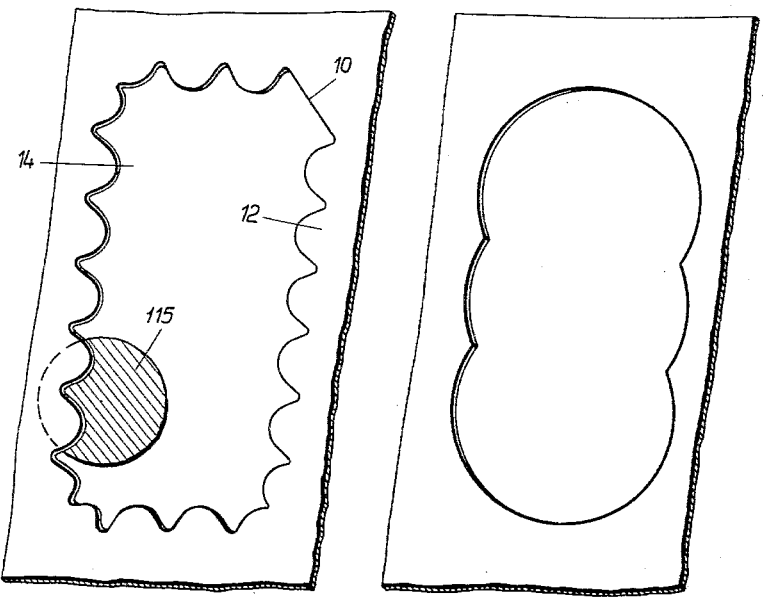

Feb. 16, 1965   B. FÜTTERER ETAL   3,169,317
SCREENING OR SHEARING FOILS FOR DRY-SHAVING APPLIANCES
Filed Aug. 7, 1962

Inventors
Bodo Fütterer
Joachim Helmer
Friedrich Blume
by:
Michael S. Striker

Feb. 16, 1965   B. FÜTTERER ETAL   3,169,317
SCREENING OR SHEARING FOILS FOR DRY-SHAVING APPLIANCES
Filed Aug. 7, 1962   2 Sheets-Sheet 2

Inventors
Bodo Fütterer
Joachim Helmer
Friedrich Blume
by: Michael S. Striker
Atty

United States Patent Office 3,169,317
Patented Feb. 16, 1965

3,169,317
SCREENING OR SHEARING FOILS FOR
DRY-SHAVING APPLIANCES
Bodo Fütterer, Langen, Hesse, Joachim Helmer, Bad Soden, Taunus, and Friedrich Blume, Frankfurt am Main, Germany, assignors to Braun Aktiengesellschaft, Frankfurt am Main, Germany
Filed Aug. 7, 1962, Ser. No. 215,367
Claims priority, application Germany, Aug. 16, 1961,
B 63,663
2 Claims. (Cl. 30—354)

This invention relates to dry-shaving appliances and concerns the design of the screening or shearing foils employed therein. As a rule, such a foil is stretched over the moving cutters of the cutting system and is then described as a shearing comb foil. However, it may also itself be employed as a moving inner shearing member and is then referred to as a shearing or cutting foil.

The form and size of the holes, as well as their arrangement and number, the width of the bridge portions, i.e. the portions of the foil between the holes, and the thickness of the foil are the parameters which determine the shearing quality of a dry-shaving appliance. By the term "shearing quality" is to be understood the sum of what the user demands of the appliance or, for example, in the case of comparison tests, what he observes therein, i.e. duration, closeness and smoothness of the shave, that is the shearing efficiency, on the one hand, and irritation or careful treatment of the skin, on the other hand.

There has been no lack of attempts so to determine these numerous parameters that the shearing quality becomes an optimum. Some of them can be substituted by others; thus, the size of the holes and the width of the bridge portions by the thickness of the foil which, in turn, is determined by the contradictory demands made of the material as regards flexibility and mechanical strength, and the number of holes by the shape and arrangement thereof and by the width of the bridge portions for a given total area of holes and bridge portions.

Likewise there have been numerous proposals for the shape of the holes, from the circular hole by way of the polygonal hole to the arrangement in series of a plurality of holes merging into one another to form an oblong hole or slot having sickle-shaped cutting edges. The decisive factor as regards this last and well-tried shape of hole is the recognition of the fact that the sickle-shaped projections permit longer cutting edges and a greater width of the holes without impairing the shape-retaining properties of the foil; moreover this shape results in the hairs gripped being erected more reliably.

It has meanwhile become possible to produce screening or shearing foils for dry-shaving appliances by a galvanic method which comprises the deposition of nickel on a matrix to which the screening grid and hole pattern has been applied by photomechanical methods. Exhaustive tests with screening foils produced by this method have shown that the cutting edges—which are more or less rectilinear compared with the cross-sectional dimensions of the hair—of the conventional forms of holes, if they extend obliquely to the direction of the movement of the cutters, as is desirable in particular in order to obtain a draw cut, do not afford the optimum shearing quality. In particular, soft hair has a tendency to slide somewhat along the cutting edge of the hole and to bend over, so that the shave, which it is true is gentle, is not close and smooth. Moreover, with incipient rounding of the edges due to wear, pinching phenomena occur which are the cause of skin irritation and rough or bad shaving. This drawback also occurs in a known dry-shaving appliance, the effective cutting edges of the screening foil of which are provided with a fine contour in the form of serrations with V-shaped points or teeth. These teeth likewise have rectilinear edges which extend obliquely at a certain angle with respect to the direction of movement of the cutters.

In contradistinction, the present invention proposes as a remedy that the edges of the holes should have a fine contour, known per se, comprising a plurality of repetitions per millimeter of edge length and which takes the form of an arcuate or undulating line with prominences or arches directed towards the interior of the hole.

The contours projecting in the form of arcs towards the interior of the hole provide a large number of favourable cutting angles on the cutting edge of the hole, the shearing forces become smaller, the hair is able to slide less easily and the cut is clean and close. Skin irritation due to pinching and pulling of the beard stubble disappears.

A particular feature of the invention is the fact that the fine contour is determined not only by the pattern, that is the image of the holes appearing on the matrix, but is also influenced by the so-called "lateral growth" in the galvanic bath. This process determines the final appearance of the contour and sets a limit to the possible degree of fineness.

As is known, galvanic deposits are not only built up vertically over the surface of the matrix, but the metallic ions also accumulate laterally to produce the aforesaid growth; thus, the galvanic deposit advances from the boundary line between the conductive and non-conductive areas on the matrix into the non-conductive panels or areas. In order to take this into account, the dimensions of a screening hole depicted on the matrix must be larger than those prescribed for the hole in the finished foil. A point can only be reproduced in the galvanic deposit as an arch, with the extent of the lateral growth as radius. This is the smallest possible radius which can be obtained in the contour of the edge of the hole for a given thickness of the screening foil, since lateral and vertical growth are related to one another, even if not strictly in accordance with a law. Thus, the fine contour of an edge which is produced galvanically is not an identical image but, as it were, a conformal reproduction of the course of the boundary line producing said edge on the matrix.

According the galvanically produced fine contour develops as a line which is occupied by convexities projecting towards the hole. It thereby differs fundamentally from the contour of the oblong hole or slot mentioned hereinbefore as having pointed projections of sickle shape at the cutting edges, and also from the known fine contour comprising V-shaped points or teeth.

The design of the contour can be determined by the course of the edge of the hole on the matrix (as the pattern). If the contour of the hole on the matrix is a saw-tooth line, there is formed as fine contour at the edges of the hole in the deposited foil an arcuate or undulating line in which the periodicity or repeat is equal to that of the saw-tooth lines in the pattern (matrix). The smaller the periodicity becomes, the more does the depth or amplitude of the arcuate or undulating line decrease, until finally it is swamped in the statistical roughness of the deposit; this natural roughness is always present—even at the apparently smooth edge of a round or angular hole—and therefore does not represent a parameter affecting the shearing quality. Between this limit number and the smooth hole edge there is an optimum as regards the shearing quality of a screening or shearing foil produced in accordance with the invention, this optimum being determined by the shape of the saw-teeth and the size thereof in relation to the thickness of the deposit, i.e. in relation to the thickness of the foil, and having to be ascertained for each shape of hole by experiment.

The statistical roughness of a galvanically produced contour is determined not only by the behaviour of the bath, but also by the photographic printing process employed in producing the matrix. The photographic printing lacquer by means of which the screening grid is transferred to the matrix is active during the developing and after-hardening, so that a fine contour of a high degree of fineness is swamped and blurred, even if extremely fine grain is employed in the photographic layer. If, moreover, the lacquer employed is not sufficiently stable in relation to the liquid of the bath, the contour suffers every time a deposited foil is stripped from the matrix. However, several copies are a prerequisite for economic manufacture.

In order to overcome this difficulty in carrying the invention into effect, a special photographic printing process and a special pre-treatment of the matrix have been developed which are characterised in that a brass plate employed in the usual way as the matrix is first coated with a thin layer of nickel and a solution of polyvinyl alcohol which has been sensitised by adding potassium bichromate is then applied and, after the printing and developing, is after-hardened with a solution of chromic acid and baked in at a temperature between 150° and 200° C. In fact, the tanning with chromic acid produces on the surface of the brass a strong passivation which is manifested in a fog which cannot be removed either by chemical or by mechanical after-treatment. Metals which are less sensitive are less suitable than brass as bath electrodes or matrices. Nickel, on the other hand, is not attacked by the weak chromic acid solution even in thin layers of only 20μ, so that also no fog occurs.

As the photographic printing lacquer employed exhibits extremely little activity during the photographic printing process and is very stable, there is obtained on the matrix a natural reproduction of the pattern in which the fine contour comes out cleanly and from which several galvanic copies can be made.

Figures 3, 4:
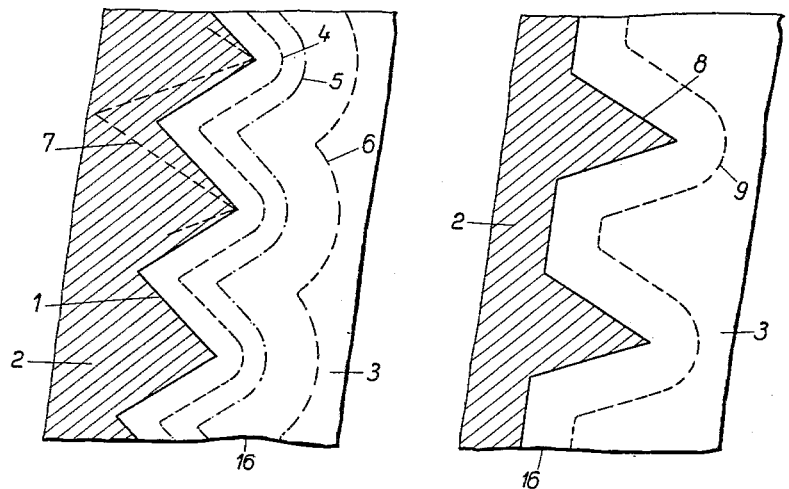
Figure 5:
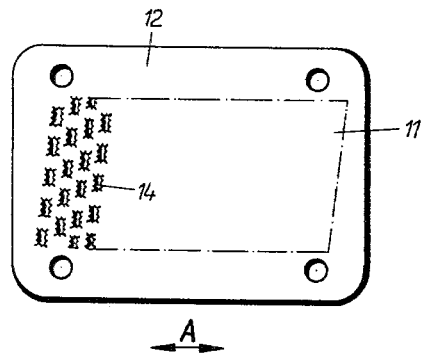
Figure 6:
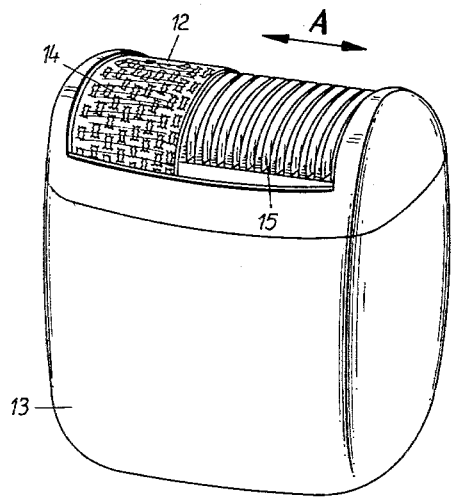

The invention is described hereinafter with reference to the accompanying drawings which illustrate several examples of embodiment of the invention, and in which:

FIGURE 1 shows, greatly enlarged, a somewhat parallelogram-shaped hole in a shearing foil with a fine contour edge in accordance with the invention, FIGURE 2 shows a hole with sickle-shaped cutting edges of known type on the same enlarged scale, FIGURES 3 and 4 are examples of the design of the fine contour, FIGURE 5 shows a screening foil in accordance with the invention, and FIGURE 6 illustrates, in perspective view, a dry-shaving appliance with the screening foil partly cut away.

The arrangement of the perforated or hole area 11 in the screening foil 12 of a dry-shaving appliance 13 is shown in FIGURES 5 and 6. The individual holes 14 may be circular, square, rectangular or of any other shape. Their clear width is between 300μ and 1 mm. and their edges form the cutting edges. They are usually arranged in rows which, in shearing systems comprising oscillating cutter blades 15, FIGURE 6, are arranged slightly obliquely with respect to the direction of movement A of the oscillating member of the system. The height of the bridge portions, i.e. the thickness, of the foil is about 50μ; hole edges raised with respect to the base of the foil are preferred because of their better cutting action.

FIGURE 1 shows on a greatly enlarged scale a substantially rectangular hole 14 of somewhat parallelogrammic placing—because of the said inclined position of the rows of holes—while for the purposes of comparison therewith FIGURE 2 shows a known screening hole produced by punching and having sickle-shaped edges. As shown in FIGURE 1, the screening foil produced by galvanic methods exhibits at the edges of the holes an arcuate or undulating fine contour, the dimensions of which are between 20 and 150μ, that is, on the average, are smaller by one order of magnitude than the contour of a punched hole according to FIGURE 2 which can be produced with the finest mechanical tools. For the purpose of comparing the sizes, there is shown in cross-section in FIGURE 1 a beard hair 115 which has been partly cut and the diameter of which is about 100 to 200μ.

The shape of the fine contour depends on the pattern, i.e. on the shape of the boundary line between conductive bridge areas and non-conductive hole areas on the matrix, on which the lateral growth of the galvanic deposit is superimposed during the deposition of the screen on the matrix. As this lateral growth results in a rounding of all the contours, a saw-tooth-shaped boundary line for the edge of the hole on the matrix is advisable for a fine contour.

The lateral growth moreover results in the rounding of the edges of the hole which are located on the top of the screening foil, but this rounding will not be discussed further herein.

FIGURE 3 shows three examples of the effect of a narrow and wide toothing, in relation to the thickness of the foil, as a section of a greatly enlarged edge of a hole. The reference 1 designates the boundary line between the conductive area 2, which is shaded, of the matrix 16 on the top of which the bridge portions of the screen are built up, and the non-conductive area 3, which produces a hole 14 in the screen.

Thus, assuming the same foil thickness (and thus equal lateral growth) in all cases, the three lines 4, 5 and 6 signify different enlargements and, referred to one of them, the saw-tooth pattern 1 has in each instance a certain repeat or periodicity, i.e. the distance between the points of the pattern or original. If the foil thickness and lateral growth are taken as being equal and to be 50μ, the arcuate fine hole-edge contour 4 is obtained for a periodicity of 300μ (equal to 6 times the thickness of the foil) and a repetition number of 3 to 4 per mm., the arcuate contour 5 for a smaller periodicity of 150μ (equal to 3 times the thickness of the foil) with a repetition number of 6 to 7 per mm., while the contour 6 shows that the fine contour is swamped in lateral growth as soon as the periodicity of the pattern arrives at the order of magnitude of the extent of the lateral growth or—this being synonymous—of the foil thickness. If the repeat is made too close or fine the gaps between the teeth are overgrown in the galvanic deposit and only a slightly undulating hole edge is formed. In that case, deeper teeth are also of no use, as will be seen from the large-dash line 7 in conjunction with the line 6.

The saw-tooth pattern does not have to be either symmetrical or continuous. FIGURE 4 shows a pattern similar to FIGURE 3, in which the boundary line 8 has points which are interrupted by wide gaps. With a repeat of four times the foil thickness (or 200μ), there is obtained a pronounced undulating shape 9 as compared with the arcuate contour 5 in FIGURE 3, for which approximately the same proportions apply. In this way the possibility is available of varying the fine contour.

The pattern can also be varied between different holes in a foil or along the edge of a hole. It may also differ from the pure saw-tooth form. In designing, however, it must be borne in mind that a mathematically exact point cannot be transferred accurately to the matrix, so that the saw teeth in the matrix are virtually not pointed from the outset and, in electroplating, the arches or prominences directed towards the interior of the hole will always turn out flatter than is shown in FIGURES 3 and 4. On the other hand, the points directed towards the bridge portions come out very well, since they are produced by a growing together of the lateral accumulations and are not determined by the details of the pattern at the base of the saw-tooth line. Now and then, transitional portions 10, as illustrated in FIGURE 1, are advisable.

The drawn pattern or original of the smallest unit of the hole area is manifolded photographically, the hole area is assembled and, after photographic reduction on a microfilm, is transferred to the brass matrix coated with a fine layer of nickel and prepared with a sensitised solution of polyvinyl alcohol. After the printing and developing, the exposed layer is treated with a weak solution of chromic acid and the developed pattern is then baked in at about 180° C.

If screening or shearing foils having hole edges which are raised with respect to the base of the bridge portions are to be produced, a thin nickel frame can first be deposited, the surface of which is passivated before the electrode is suspended in the bath prepared with polishing and hardening additions and the foil is deposited. Several copies having a high degree of trueness to the original fine contour can be produced.

A cutting foil according to the invention can not only be employed as an outer cutter-covering member of a shearing system, that is as a shearing comb foil, but can also be designed as an inner cutting member itself, that is a cutter foil or cutting foil.

We claim:

1. For use in a dry-shaving appliance, a perforated foil comprising a foil element having a plurality of hair entry holes therein, the edges of said holes, respectively, forming a plurality of smoothly curved arches located closely adjacent each other and respectively having convex peripheries directed towards the interior of the respective hole, each of said curved arches having a length of only up to about 200 microns.

2. For use in a dry-shaving appliance, a perforated foil comprising a foil element having a plurality of hair entry holes therein, the edges of said holes, respectively, forming a line of smoothly curved arches arranged closely adjacent each other and respectively having convex peripheries directed towards the interior of the respective hole and the distance between the apices of adjacent ones of said curved arches being between about 50 and 200 microns.

References Cited by the Examiner

UNITED STATES PATENTS

| | | | |
|---|---|---|---|
| 2,182,067 | 12/39 | Bruecker | 76—104 |
| 2,223,768 | 12/40 | Martin | 76—104 |
| 2,266,884 | 12/41 | Martin | 30—43.92 |
| 2,298,872 | 10/42 | Dalkowitz | 30—43.9 |
| 2,423,177 | 7/47 | Cunliffe | 76—104 |
| 2,817,145 | 12/57 | Braun | 30—354 |
| 2,824,367 | 2/58 | McWilliams | 30—34.2 X |
| 3,060,572 | 10/62 | Duncan | 30—43.92 |
| 3,068,568 | 12/62 | Schnapp | 30—43.92 X |

FOREIGN PATENTS

| | | |
|---|---|---|
| 1,259,373 | 3/61 | France. |
| 845,832 | 8/60 | Great Britain. |
| 304,814 | 8/55 | Switzerland. |

WILLIAM FELDMAN, *Primary Examiner.*

EDWARD V. BENHAM, MYRON C. KRUSE,
*Examiners.*